United States Patent
Hotra

(10) Patent No.: US 8,689,224 B2
(45) Date of Patent: Apr. 1, 2014

(54) METHODS AND SYSTEMS FOR PRESERVING CERTIFIED SOFTWARE THROUGH VIRTUALIZATION

(75) Inventor: Jonathan N. Hotra, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1066 days.

(21) Appl. No.: 11/862,061

(22) Filed: Sep. 26, 2007

(65) Prior Publication Data

US 2009/0083734 A1    Mar. 26, 2009

(51) Int. Cl.
*G06F 9/46*    (2006.01)
*G06F 3/00*    (2006.01)

(52) U.S. Cl.
USPC .............. 718/104; 718/102; 710/6

(58) Field of Classification Search
USPC .......................................... 714/45
See application file for complete search history.

(56) References Cited

U.S. PATENT DOCUMENTS

| | | | |
|---|---|---|---|
| 5,956,474 A * | 9/1999 | Bissett et al. | 714/11 |
| 6,178,391 B1 * | 1/2001 | Anderson et al. | 703/1 |
| 6,253,135 B1 | 6/2001 | Hubacher | |
| 6,253,224 B1 * | 6/2001 | Brice et al. | 718/1 |
| 6,332,215 B1 | 12/2001 | Patel et al. | |
| 6,496,847 B1 | 12/2002 | Bugnion et al. | |
| 6,629,162 B1 | 9/2003 | Arndt et al. | |
| 6,658,591 B1 | 12/2003 | Arndt | |
| 6,792,514 B2 | 9/2004 | Kapoor et al. | |
| 6,820,207 B2 | 11/2004 | Dawkins et al. | |
| 6,851,649 B1 | 2/2005 | Radford | |
| 6,876,864 B1 * | 4/2005 | Chapin | 455/509 |
| 6,877,158 B1 | 4/2005 | Arndt | |
| 6,883,116 B2 | 4/2005 | Lee et al. | |
| 6,895,501 B1 * | 5/2005 | Salowey | 713/168 |
| 7,003,771 B1 | 2/2006 | Arndt | |
| 7,174,545 B2 * | 2/2007 | Keim et al. | 717/148 |
| 7,272,681 B2 | 9/2007 | Davies | |
| 7,272,831 B2 | 9/2007 | Cota-Robles et al. | |
| 7,346,909 B1 * | 3/2008 | Eldar et al. | 719/312 |
| 7,562,349 B2 * | 7/2009 | Fleischer et al. | 717/122 |
| 7,607,129 B2 | 10/2009 | Rosu et al. | |
| 8,054,832 B1 | 11/2011 | Shukla et al. | |
| 2002/0184289 A1 | 12/2002 | Katoh et al. | |
| 2003/0037305 A1 | 2/2003 | Chen et al. | |
| 2003/0182032 A1 | 9/2003 | McWalter et al. | |
| 2003/0182467 A1 | 9/2003 | Jensen | |
| 2004/0206854 A1 | 10/2004 | Shah et al. | |
| 2004/0230712 A1 | 11/2004 | Belmar et al. | |
| 2006/0206898 A1 | 9/2006 | Miner et al. | |
| 2006/0233168 A1 | 10/2006 | Lewites et al. | |
| 2007/0028244 A1 | 2/2007 | Landis et al. | |

(Continued)

OTHER PUBLICATIONS

Wlad, J.; Software Rescue: A Safety-Critical Primer; IEEE A&E Systems Magazine; Apr. 2007; pp. 18-22.

(Continued)

*Primary Examiner* — Meng An
*Assistant Examiner* — Wissam Rashid
(74) *Attorney, Agent, or Firm* — Armstrong Teasdale LLP

(57) ABSTRACT

A method for reusing certified software applications without recertification is provided. The method includes creating a virtual machine, that includes at least one of the software applications, the virtual machine including an operating system and at least one interface, certifying the virtual machines, and deploying the certified virtual machine in at least one representation of an underlying hardware platform.

13 Claims, 5 Drawing Sheets

(56) References Cited

U.S. PATENT DOCUMENTS

| | | | |
|---|---|---|---|
| 2007/0174850 A1 | 7/2007 | El Zur | |
| 2007/0233775 A1* | 10/2007 | Jackson et al. | 709/201 |
| 2007/0277175 A1 | 11/2007 | Lutter | |
| 2007/0300218 A1* | 12/2007 | Mann | 718/1 |
| 2008/0098194 A1 | 4/2008 | Hashimoto et al. | |
| 2008/0155153 A1 | 6/2008 | Yoshii et al. | |
| 2008/0178261 A1 | 7/2008 | Yao et al. | |
| 2008/0189700 A1 | 8/2008 | Schmidt et al. | |
| 2008/0196043 A1 | 8/2008 | Feinleib et al. | |
| 2008/0209279 A1* | 8/2008 | Van Riel et al. | 714/45 |
| 2008/0301676 A1* | 12/2008 | Alpern et al. | 718/1 |
| 2009/0083734 A1 | 3/2009 | Hotra | |
| 2011/0072428 A1 | 3/2011 | Day, II et al. | |

OTHER PUBLICATIONS

TenAsys Real-time Hypervisor; Host Real-time and General-purpose Operating Systems on a Single Hardware Platform with Intel® Virtualization Technology; www.tenasys.com; Aug. 2006; pp. 1-11.
Brian, T.; Software Certification and Standards: What Every Device Manufacturer Should Know; www.embedded.com; Sep. 21, 2006; pp. 1-9.
Adding it Up: Virtualization Reduces IT Costs; IBM Virtualization View; http://www.03.ibm.com/systems/virtualization/view/031407.html; 3 pages.
Enhanced Virtualization on Intel® Architecture-based Servers; Intel®; http://www.intel.com/business/bss/products/server/vitualization_wp.pdf; 2006; 12 pages.
Adams, K., et al.; A Comparison of Software and Hard Techniques for x86 Virtualization; ASPLOS'06; Oct. 21-25, 2006; http://www.vmware.com/vmtn/resources/528; 12 pages.
Shankland, S.; Linux Heavies Plan Lightweight Virtualization; http://www.news.com//Linux+heavies+plan+lightweight+virtualization/2100-7339_3-6108272.html; Mar. 14, 2007; 3 pages.
Native Virtualization; http://en.wikipedia.org/wiki/Native_virtualization; last modified Jul. 6, 2007; 2 pages.
x86 Virtualization; http://en.wikipedia.org/wiki/X86_virtualization; last modified Sep. 13, 2007; 6 pages.
Vance, A.; Microsoft Starts Supporting, er, Linux; The Register; http://theregister.co.uk/2006104/03/ms_virtual_free/; Apr. 3, 2006; 5 pages.
Vance, A.; Microsoft Promises to Give Away Key Virtualization Spec; The Register; http://theregister.co.uk/2006/10/17/microsoft_vhd_away/; Oct. 17, 2006; 2 pages.
Virtualization in Linux—KVM and Xen; Intel® open Source Technology Center; http://oss.org.cn/2007-OSS-CONF/2007-sub-bbs/7.pdf; Jun. 5, 2007; 16 pages.
Van Doorn, L; Hardware Virtualization Trends; IBM; T.J. Watson Research Center; Jun. 14, 2006; https://db.usenix.org/events/vee06/full_papers/vandoorn-keynote.pdf; 44 pages.
Abramson, D. et al.; Intel® Virtualization Technology for Directed I/O; Intel Technology Journal; Aug. 10, 2006; vol. 10, Issue 03; pp. 179-192.
Neiger, G. et al.; Intel® Virtualization Technology: Hardware Support for Efficient Processor Virtualization; Intel Technology Journal; Aug. 10, 2006; vol. 10, Issue 03; pp. 167-178.
Intel® Trusted Execution Technology; Intel®; http://www.intel.com/technology/security/downloads/trusted_exec_tech_over.pdf; 2 pages.
Xen; http://en.wikipedia.org/wiki/Xen; last modified Sep. 22, 2007; 5 pages.
Open VZ; http:llen.wikipedia.org/wiki/OpenVZ; last modified Sep. 24, 2007; 5 pages.
QEMU; http://en.wikipedia.org/wiki/Qemu; last modified Sep. 21, 2007; 4 pages.
Bottemley, J.; Virtualization Changes in 2.6.21; http://virtualization.sys-con.com/read/382928.htm; May 31, 2007; 2 pages.
VMware Introduces Support for Cross-Platform Paravirtualization; http://www.vmware.com/company/news/releases/050907PV.html; May 9, 2007; 2 pages.
Davis, M.; Virtual PC vs. Virtual Server: Comparing Features and Users; Microsoft Corp.; http://www.microsoft.com/windowsserversystem/virtualserver/techinfo/vsysvpc.mspx; May 2005; 13 pages.
Windows Server Virtualization; http://en.wikipedia.org/wiki/Windows_Server_Virtualization; last modified Jun. 17, 2007; 2 pages.
Windows Server Virtualization—An Overview; http://www.microsoft.com/windowsserversystem/virtualserver/techinfo/virtualization.mspx; May 2006; 12 pages.
RTS Real-Time Hypervisor; Real Time Systems; http://www.real-time-systems.com/real-time_hypervisor/index.php; Feb. 12, 2007; 2 pages.
Trango Introduction to Virtualization; TRANGO Virtual Processors; http://www.trango-vp.com/documentation/virtualization/into.php; 3 pages.
Meeting the Challenges of Connected Device Design Through Real-Time Virtualization™; VirtualLogix; http://www.virtuallogix.com/uploads/media/VLX_WhitePaper_Virtualization_for_Connected_Devices_04.pdf; 2006; 12 pages.
Improved Service Delivery in Network Infrastructure Through Real-Time Virtualization™ on Intel® Virtualization Technology; VirtualLogix; http://www.virtuallogix.com/uploads/media/VLX_WhitePaper_VirtualizationIntelVT_for_Nl_02.pdf; 2006; 12 pages.
ARINC6653 (ARINC 653-1); LynuxWorks; http://www.lynuxworks.com/solutions/milaero.arinc-653.php; 3 pages.
Green Hills Software Extends Integrity PC to Enable the Integration of Windows Applications in Secure Systems; Green Hill Software, Inc.; http://www.ghs.com/news/20050419_secure_integrity_pc_html; Apr. 19, 2005; 3 pages.
ntegrity Padded Cell Secure Virtualization Solution; Green Hill Software, Inc.; http://www.ghs.com/download/datasheets/INTEGRITY_PC.pdf; 2 pages.
Vaughn-Nichols, S.J.; New Approach to Virtualization is a Lightweight; Computer; Nov. 2006; IEEE Computer Society; vol. 39; Issue 11; pp. 12-14.
Uhlig, R.; Intel Virtualization Technology; Computer; May 2005; IEEE Computer Society; vol. 38; Issue 5; pp. 48-56.
European Search Report of Application No. 12174226.6-1243; Sep. 14, 2012; 9 pages.
Goldberg, R.; Survey of Virtual Machine Research; Computer, IEEE Service Center; Jun. 1, 1974; pp. 34-45; vol. 7, No. 6; Alamitos, CA, US.
The Top Five Virtualization Mistakes; Vyatta; http://www.vyatta.com/sites/vyatta.com/files/pdfs/Vyatta_BiggestVirtualizationMistakes.pdf; 2007; 8 pages.

\* cited by examiner

METHODS AND SYSTEMS FOR PRESERVING CERTIFIED SOFTWARE THROUGH VIRTUALIZATION

BACKGROUND OF THE INVENTION

This invention relates generally to certification of software and reutilization of existing software, and more specifically, to methods and systems for preserving certified software through virtualization.

Many systems exist today that depend on software written a long time ago. These systems are proven to work and are often certified, but they may be in need of modification to accommodate new requirements or obsolescence issues. It is often not feasible or economical to modify proven or certified software systems.

One reason is that the certification of software is expensive. In the case of flight critical software, the FAA encourages the use of RTCA's DO-178B guidelines for certification. It has been shown that software certification to the guidelines of DO-178B has a cost, per line of code, that ranges from $50 to $100. Interpolating, certification of 100,000 lines of code to the guidelines of DO-178B could range from $5 to $10 million. However, these costs are just the upfront costs, and it would be desirable to preserve some of this investment so that it would be of benefit in later iterations of the software.

The practice most often used when it comes to software certification is to write the software on a per application basis and get the whole system (software and hardware) certified. Using this approach, any subsequent change to the software (or hardware) after certification results in a recertification effort for the entire system.

In systems related to aircraft safety and operation, for example, space and time partitions have been used to partition the software into safety critical and non-safety critical regions. The partitioning guarantees that one partition cannot impact the operation of another partition. Since this guarantee is in place, software can be divided into safety critical and non-safety critical partitions. In certain applications only the safety critical partition is subject to certification. By only certifying the safety critical portion of the code, the certification cost for a particular system is reduced. To achieve such partitions, an operating system (OS) kernel is modified to provide the protections. Hardware protections for space partitions can be achieved using memory management unit hardware. All time partitions must be achieved in software. Hardware protections always provide superior protection to software protections for system resources.

Recently, the Federal Avionics Administration (FAA) has provided Advisory Circular (AC) 20-148 which describes a process that can be used to obtain FAA acceptance of a reusable software component. Also, the International Electrotechnical (IEC) 61508 safety standard allows for reusable software components. AC 20-148 and IEC 61508 are likely intended for certifying pieces of an application such as operating systems (OSes) or board support packages (BSPs). Being able to reuse software reduces the overall cost of the product over its lifetime.

In many applications, software reuse is not being maximized. As described above, this lead to more software code having to be recertified for later iterations within the system. Considering maintenance of software has been estimated at up to eighty percent of the total cost of a product, any increase in the reuse of certified software should result in considerable cost savings.

BRIEF DESCRIPTION OF THE INVENTION

In one aspect, a method for reusing certified software applications without recertification is provided. The method includes creating a virtual machine, which includes at least one of the software applications, the virtual machine including an operating system and at least one interface, certifying the virtual machines, and deploying the certified virtual machine in at least one representation of an underlying hardware platform.

In another aspect, a packaging method for portable, certified software applications is provided. The method includes packaging at least one software application, an operating system associated with the at least one software application, and at least one communication device within a virtual machine, certifying the virtual machine, configuring at least one communication device to interface to the virtual machine, and utilizing the at least one communication device as an interface between the virtual machine and a hardware platform.

In still another aspect, a system architecture is provided that includes a first virtual machine comprising a first software application, a second virtual machine comprising a second software application, and a communications mechanism configured to interface the first virtual machine to the second virtual machine, and provide an interface for the virtual machines to a hardware platform.

DETAILED DESCRIPTION OF THE INVENTION

Figure 1:
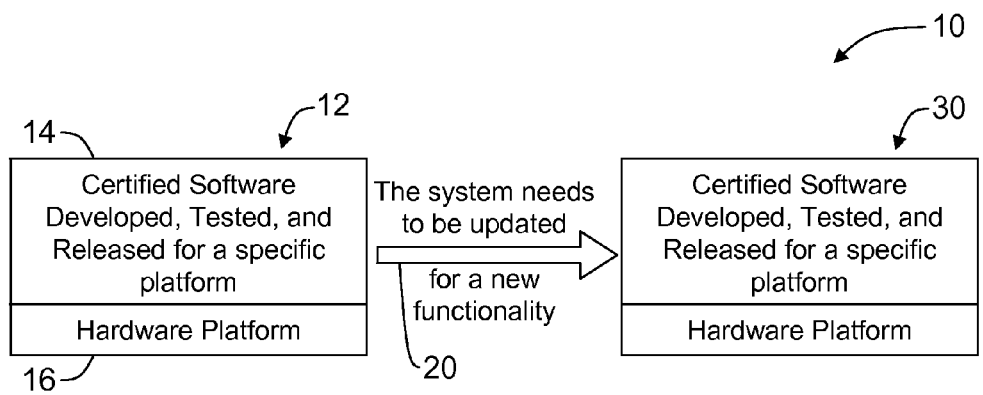
FIG. 1 illustrates a traditional approach to the updating of certified software.

The following description is merely exemplary in nature and is in no way intended to be limiting, either in application or use. Although one or more configurations are described with reference to inter-operating systems communications between virtual machines, the configurations are not so limited. Other and additional configurations are contemplated in connection with other virtual machines and information systems, including but not limited to other and additional types of communications interfaces, including a gateway-based architecture.

It is useful to reuse Operating Systems (OSes) or board support packages (BSPs) and a cost savings can be realized by undertaking such an approach. However, considering an entire software application as a reusable software component would allow greater reuse of the software and likely result in additional cost savings.

As mentioned above, space (sometimes referred to as memory) and time partitioning provides an excellent way to reduce the amount of software that needs to be certified. One way to build on this approach would be to use virtualization features that are becoming available in both software and hardware. Virtual machines result in a design that provide even better partitioning than space and time partitioning, and allow even greater software reuse.

The embodiments described herein also utilize space and time partitioning techniques, but combining these with virtualization results in a greater possibility of reuse of the existing software in future product iterations. This greater possibility of reuse comes about because there are no longer any hardware or software restrictions since any real hardware can be adapted to fit the virtual machine in which the software is run. Additionally, a hypervisor which controls all resources on the system does not care what OS is running in the virtual machine. So a system that has been implemented using virtual machines would have no hardware or OS dependencies in later iterations.

There are also more hardware protections being provided by processor and chipset vendors for the purpose of virtualization. Use of virtualization provides stronger guarantees over space and time partitioning architectures.

While the embodiments herein are described in regards to flight software certification, the implementations are generic and suitable enough to be used in any sort of certification program. One reason this is believed to be so is because a certification process that is more rigorous than safety of flight is difficult to imagine.

Certified software can be used for decades. With the virtualization approach mentioned above, it can be illustrated how virtual machines can be added to a system on an as needed basis, to extend the life of the system over a long lifecycle, all based on a certified software system. It has already been proposed to extend a certified legacy applications life by placing the application within a virtual machine. While such an extension might be feasible, it depends heavily on the software design associated with the certified legacy application. To state it more simply, if there is not an easy place to extend the code, then the virtualization approach does not work.

All software code that is written and used within a system eventually becomes legacy code. One embodiment described herein utilizes virtual machines, upfront, during the design of the system. Such an approach allows for easy extension of the system without having to recertify all of the software within the system. Virtual machines provide strong partitioning features. By configuring the system to include virtual machines during the design phase, it can be easily extended without recertification of the software therein.

Having provided the foregoing introduction, FIG. 1 is a block diagram 10 illustrating the traditional approach to certified software. When a new functionality was required for the system represented by architecture 12, which includes certified software 14 and a hardware platform 16, the software is modified as needed, as represented by the arrow 20. However, and referring to the system represented by architecture 30, upon any software change, the whole application has to be recertified.

A Simple Virtualization Design

Figure 2:
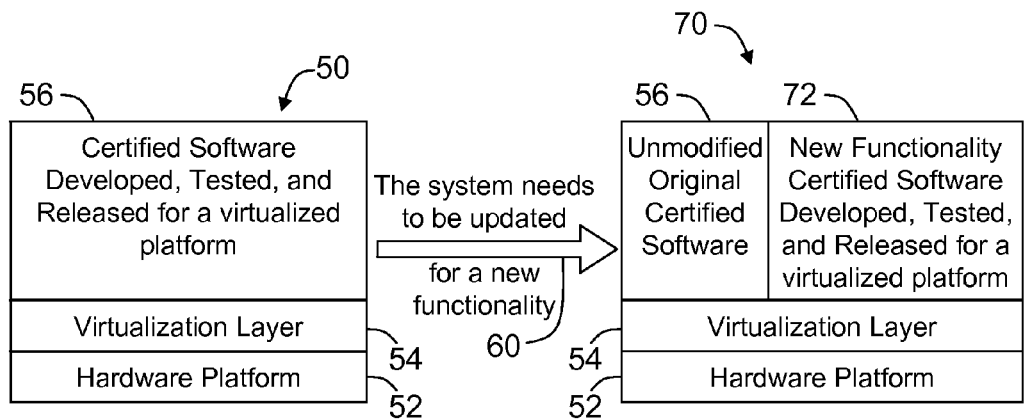
FIG. 2 illustrates an approach to the updating of software through virtualization.

One simple virtualization design case is the placement of the entire application within a virtual machine and the certification of this application. Such a design is illustrated by FIG. 2, where at least a portion of existing software is preserved through virtualization techniques. Referring specifically to FIG. 2, architecture 50 represents a system that includes a hardware platform 52, a virtualization layer 54, and one or more modules of certified software 56.

When such a system is determined to need a new feature incorporated therein, as illustrated by arrow 60, this feature is placed in a new virtual machine which is included in architecture 70. Architecture 70 includes the hardware platform 52, virtualization layer 54, and certified software modules 56 as before, but also separately certified software 72 that is dedicated to the new functionality.

In the approach represented by FIG. 2, software is designed with knowledge that the system would likely need to be modified in the future. Through the use of virtualization layer 54, the certified software, including the originally certified software modules 56 and newly added certified software 72, is strongly partitioned and very portable. Using virtualization presents a strong case to any certification authorities that the software is unmodified as claimed and can be reused without recertification.

As a matter of definition, and referring to FIG. 2, certified software 56 is software that is subject to certification through some authority, for example, the Federal Aviation Administration. To be certified, such software follows guidelines laid out by standards such as RTCA's DO-178B or IEC 61508. Hardware platform 52 is a computing platform. Examples of a hardware platform 52 include embedded systems computers or personal computers.

The virtualization layer 54 is a virtualized representation of an underlying hardware platform. It is similar in many ways to the underlying hardware, but there is no requirement that it must be the same. In other words, a virtualization layer can be realized in hardware, software or in a combination of hardware and software. Virtualization includes technologies such as hypervisors, virtual machine monitors (VMM), native hardware virtualization, virtual machines, paravirtualized OSes, and OS container virtualization. A virtualization layer may also include time and space partitioned operating systems implementing a standard such as ARINC 653. Time and space partitioning are not the same as virtualization, but some of the partitioning concepts are similar in nature to virtualization.

Hypervisor or VMM based virtualization layers provide the greatest opportunity for reusing certified software without modification. The more software that can fit in the Unmodified Original Certified Software box of certified software 56 produces the most savings in future iterations of the product. However, there are limits to the reuse of certified software, as being able to reuse certified software does not usually eliminate the need for the entire system to have to undergo certification.

Besides reuse of the certified software in future iterations of a given system, the same certified software could be utilized in other systems if same functionality was needed in other systems that required certification.

Figure 3:
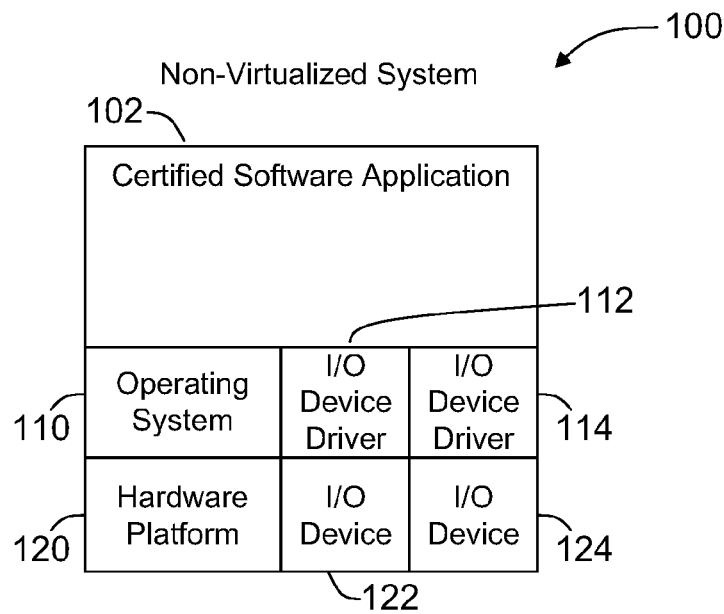
FIG. 3 illustrates an architecture associated with a non-virtualized system.
Figure 4:
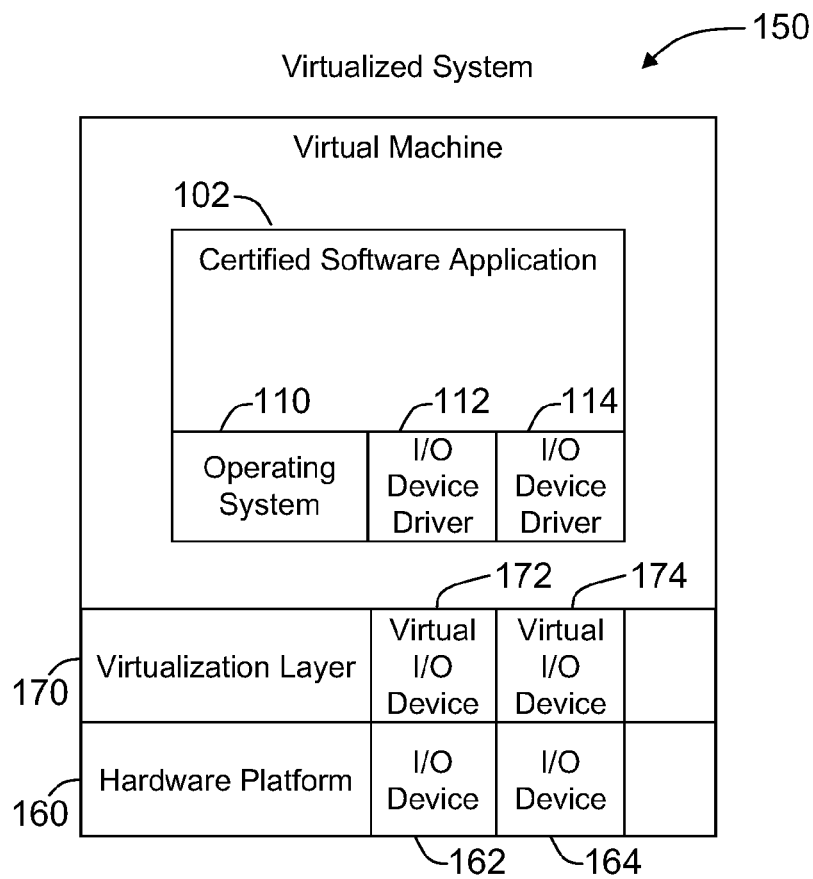
FIG. 4 illustrates an architecture associated with a virtualized system.

FIGS. 3 and 4 illustrate the reuse of software through Input/Output (I/O) interfaces. In the non-virtualized system architecture 100 of FIG. 3, a certified software application 102 runs on an operating system 110 that includes input/output device drivers 112 and 114. The operating system 110 provides an interface between the application 102 and a hardware platform 120, which includes the input/output devices 122 and 124 controlled via the device drivers 112 and 114 respectively.

In the virtualized architecture 150 of FIG. 4, the certified software application 102, operating system 110, and input/output device drivers 112 and 114 are contained in a virtual machine and are portable to one or more different hardware platforms 160, including input/output devices 162 and 164 through virtualization. The virtualization layer 170 provides an interface between the operating system 110 and the hardware platform 160, and includes virtual I/O devices 172 and 174. Virtual I/O devices 172 and 174 provide respective interfaces between input/output device drivers 112 and 114 and input/output devices 162 and 164. Virtualization layer 170 and virtual I/O devices 172 and 174 are modifiable so that a certified software application, or virtual machine, is portable to multiple hardware platforms and, in the case of FIG. 4, multiple I/O devices.

The example of FIGS. 3 and 4 illustrate one method to achieve reuse through virtualization. While it is possible to achieve reuse through the method illustrated in FIG. 4, the method is also somewhat restrictive. Any restrictions reduce the likelihood of being able to reuse the software without modification. However, such an approach might be capable of use even in a legacy certified application that wasn't designed upfront for preservation of software through virtualization.

Figure 5:
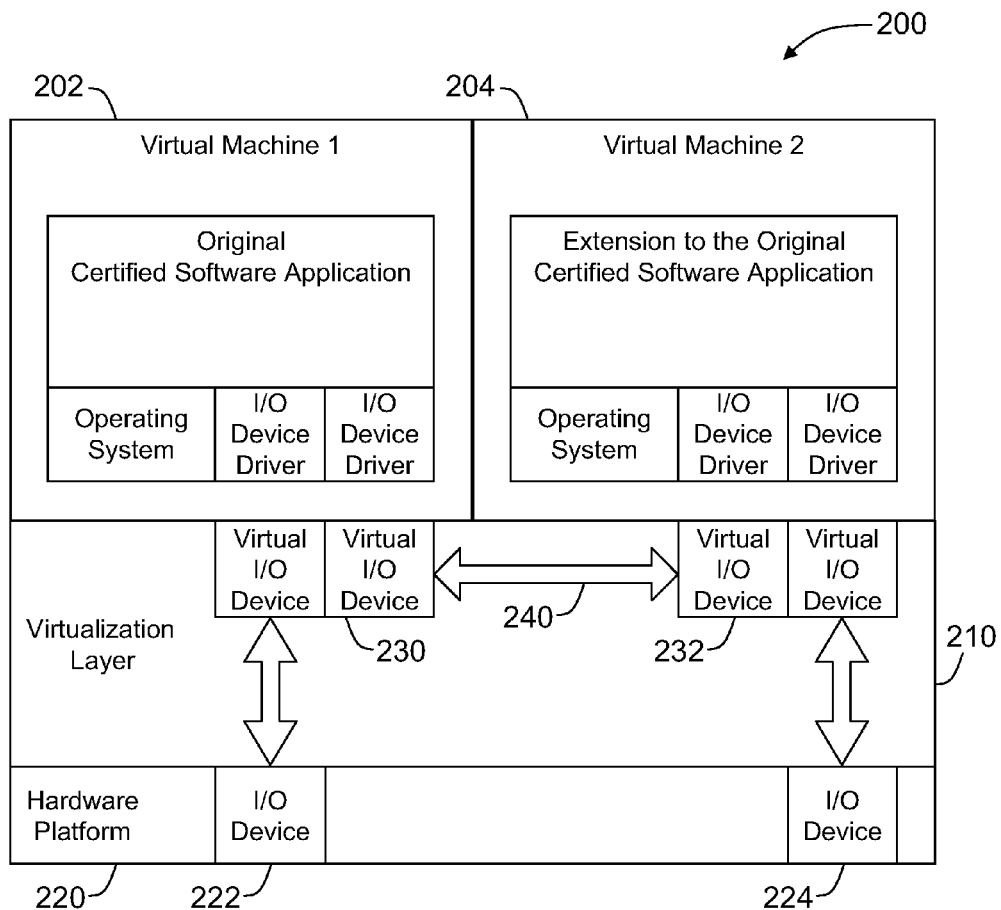
FIG. 5 illustrates extension of certified software using virtual input/output devices and a communication mechanism within the virtualization layer.

FIG. 5 illustrates a system 200 that includes two virtual machines 202 and 204 that are similar to the virtual machine described with respect to FIG. 4. System 200 includes a virtualization layer 210 interfacing the virtual machines 202 and 204 to a particular hardware platform 220 having I/O devices 222 and 224. Referring specifically to virtualization layer 210, to extend the certified code associated with virtual machines 202 and 204, a virtual I/O device 230 is rerouted through the virtualization layer 210. Virtual I/O device 230 is created to have the same interface as the original I/O device 224. I/O traffic can now be intercepted by the virtual I/O device 230 and passed along to a second virtual I/O device 232, for example, via a communication mechanism 240 within the virtualization layer 210. One example of such a communication mechanism is an inter-OS communication (IOC) mechanism provided by the Virtualization Layer. Examples of IOC mechanisms are virtual Ethernet or shared memory. The second virtual I/O device 232 passes the I/O traffic from virtual I/O device 230 to virtual machine 204 which contains the extension to the original certified software application. In such a configuration, only code within the virtualization layer 210 and virtual machine 204 would need to be certified, allowing the code to remain certified in virtual machine 202.

The virtualization approach illustrated in FIG. 5 has interesting possibilities. For example, if an I/O device associated with hardware platform 220 is no longer used in system 200, all of the I/O traffic associated with that I/O device may be intercepted and repacked for an I/O device associated with the second virtual machine 204. As an example, if system 200 was an operational flight program that used I/O over a MIL-STD-1553 bus, a new design for the system may incorporate Ethernet for all of the I/O. As the virtual machine 202 is not tied to a hardware platform, virtualization will allow the software, originally intended to interface to a MIL-STD-1553 bus to be reused even though the system is running as an Ethernet only platform. A downside to this approach is that the original certified application can only be extended through the I/O devices with which it was originally designed.

An approach similar to using virtual I/O devices to extend the system can be done through incorporation of memory. In the embodiment, all memory within the system is managed by the virtualization layer. Therefore, memory pages are intercepted in the virtualization layer and routed to another virtual machine(s) to extend the software. The original software application would then have to be extended by interpreting the code at its Application Binary Interface (ABI).

Figure 6:
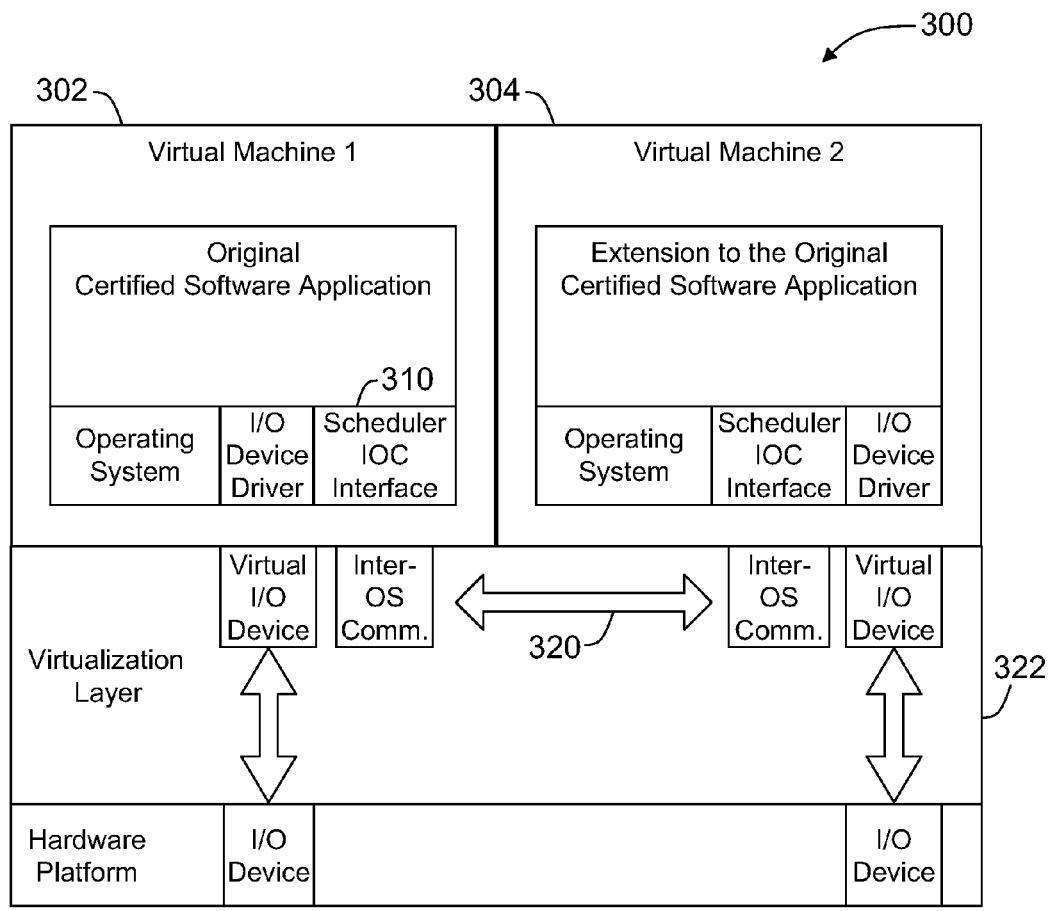
FIG. 6 illustrates extension of certified software using virtual input/output devices and an inter-operating system communication mechanism within the virtualization layer.

FIG. 6 illustrates of decomposition of a system 300 into multiple virtual machines 302 and 304. System 300 was decomposed into a virtual machine 302 during the initial design of system 300. It is possible to preserve much of the original software associated with virtual machine 302 in future iterations or to use the same certified software in other applications. The example of FIG. 6 considers the case where a scheduler 310, or other interface such as an executive code was placed into the initial virtual machine 302. As described with respect to FIG. 6, scheduler 310 could have its interface available to other virtual machines via an inter-OS communication (IOC) interface 320 within the virtualization layer 322. Under such a scenario, additional functionality may be added to the original application simply by adding another virtual machine, such as virtual machine 304 and providing access to the original scheduler 310 through the IOC interface 320.

Inter-OS communication (IOC) within a virtualization layer provides a mechanism for communications between operating systems in virtual machines. These IOCs are often the same mechanisms that are used for inter-process communications (IPCs) in operating systems. Examples of IPCs are sockets, messages queues, semaphores, events and shared memory. In addition to IPC-like mechanisms, lower level mechanisms are also provided for IOCs; such as virtual networks and interrupts.

Figure 7:
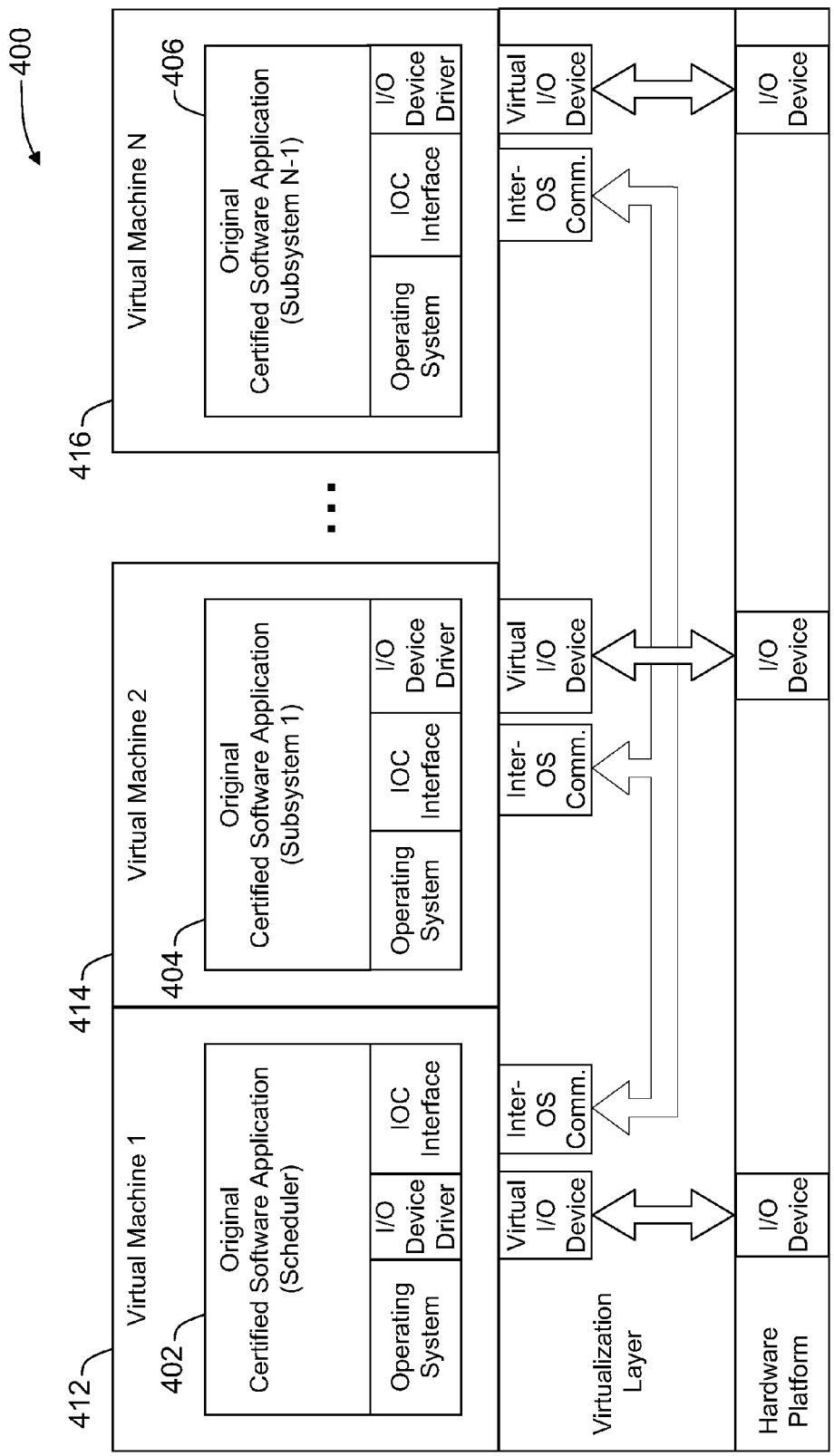
FIG. 7 illustrates extension of certified software using a decomposition design where each application is contained within a separate virtual machine.

Virtualization and decomposition may be implemented in a large number of ways. The greater the amount of decomposition, the greater the number of available components that can be reused in future applications, as illustrated in FIG. 7. FIG. 7 illustrates an architectural design for a system 400. In other architectural designs, the thought may be to place all of the application code into one virtual machine and have only a scheduler or executive code reside in its own virtual machine. If written well it is unlikely that the scheduler would need to be modified in future or other applications of the code. However the architecture of system 400 takes into account that it is possible that a given subsystem might need to be updated in the future.

System 400 illustrates that all subsystems 402, 404, and 406 may be respectively placed into their own virtual machines 412, 414, and 416. By decomposing the software into virtual machines, the greatest amount of code reuse can be realized, without regard to whether the code in one or more of the virtual machine was likely or unlikely to need a change in the future.

Under the architectural configurations described above, certification processes become simpler. The new virtual machine is certified, and the combination of the two virtual machines is certified, based on the certification of the original virtual machine. This "add a new virtual machine" approach can be taken for all iterations of the product provided there is an easy way to plug in new features into the existing certified virtual machine(s). For a new iteration only the new virtual machine's software needs to be certified as the software in the original virtual machine(s) would remain unchanged.

There is no requirement that an I/O device be present for a virtual machine. For that matter there is no requirement that an inter-operating system communication (IOC) interface be present. One of the two is incorporated, however, so there is a way to communicate with the applications within the virtual machine.

An example of an aircraft is utilized to help further illustrate virtualization. In an embodiment, the initial aircraft software is built in a virtual machine and is certified. Subsequently a need is determined, and the decision is made to add a new Global Positioning System (GPS) device the system. Adding such a device might be referred to as a system iteration. All of the software for support of this GPS in the system can be developed within its own virtual machine. The original application virtual machine and the GPS virtual machine can now be certified together with only the GPS virtual machine software having to be certified. A whole system certification would then be performed.

Even with the simple designs described above that introduce virtualization, the amount of reuse in a system could be significant. However, and as described herein, architecting the system to anticipate such changes provides even greater benefits.

As described with respect to FIG. 7, one sophisticated approach is to use multiple virtual machines upfront in the original system design. Specifically, if the system is split into more pieces the ability to update and upgrade existing functionality in the system becomes possible without having to recertify a significant portion of the unmodified and existing software code.

Consider the aircraft example again, where a radar device was included in the original system design. Subsequently it is determined that the radar device needs to be updated due to an upgrade of the radar system. In the case of a simple virtualization design, the original virtual machine will have to be modified and recertified to support the radar upgrade. The previously added GPS virtual machine remains certified and does not have to be recertified. However, software code within the original virtual machine, unrelated to the radar, does have to be recertified even though it is unchanged simply because it was included in the virtual machine that included the original radar.

The virtualization approach illustrated in FIG. 7 is to separate the system into multiple virtual machines upfront, in the original design phase. Since it is likely that software for most individual subsystems will be updated at some later date, generating a virtual machine for each individual subsystem simplifies certification, as only the updated virtual machine has to be recertified. In a related example of virtualization design, it is possible that certain virtual machines, for example, a scheduler, could remain unchanged through the life of the system. Since the scheduler may remain unchanged, placing it in its own virtual machine also makes sense.

As mentioned above, an analogous approach may be taken with respect to space and time partitioning to accrue further benefits of virtualization. Space and time partitioning are just one aspect of a virtualized system. So a space and time partitioned system is just a subset of a virtualized system.

There are no operating system (OS) or hardware dependencies in a virtualized system. As has often happened many times, in many products, that an OS or hardware previously chosen for a system no longer exists at a later date when it is time to upgrade the system.

Software in a virtual machine is isolated from hardware changes. Even if the hardware changes, a virtual device can be created in the virtualization software to replace the hardware and the software application in the virtual machine would not know it is using a different device. Only the virtual device would need to be certified.

The OS or board support package (BSP) dependency is removed because the system is using the code in the virtual machine at its interface layer. As long as the code doesn't need to be changed in the virtual machine it doesn't matter how it was implemented or on what platform the code was designed for. Therefore, in later iterations it is possible that there could be multiple OSes running in the same system. Some of these OSes might even be obsolete legacy systems. A useful side effect of this approach is that newer software techniques and tools can be used on future iterations without regard to how the original code was developed.

Hypervisors

In one embodiment, a real-time hypervisor includes software code that is configured to control all access to the system resources and provide the virtualization platform on which to run the system. A hypervisor may be referred to as a micro kernel operating system (OS). This is a small piece of software that is certified in addition to the certification associated with the application software.

Developers of some applications have gone through the effort of certifying their real-time OS for DO-178B as a reusable software component. Therefore it is anticipated that real-time hypervisor vendors will provide the same certified software. While for the purposes of this disclosure it does not matter if the vendors certify their own hypervisor, other than it save the certification effort on end users that utilize the multiple virtual machine approach.

It is anticipated that the day will come when hypervisors also become obsolete, just like OSes. However, the virtualization approach is still beneficial as compared to the currently used approaches. As the virtual machine itself is encapsulated in a software interface, the hypervisor can run the virtual machine and provide it with resources. Therefore, even in the event of hypervisor obsolescence, it would be straightforward for another virtualization vendor to support the virtual machine interface. Such a software encapsulation also provides the possibility to change virtualization vendors at a later date, allowing the virtual machines to be migrated.

Hypervisors and virtual machines are described extensively herein, because they are the current technology available for implementing within an application, and are very useful. In alternative embodiments, the virtualization option utilized include container based OS virtualization. Container based virtualization locks the system designer into a particular OS. Such an approach is less flexible and increases the obsolescence issues for a system in which it is implemented. The container based virtualization approach utilizes software broken up into multiple OS environments called containers, which are analogous to the virtual machines described above.

The above described embodiments provide, in one aspect, reusable objects encapsulated in virtual machines which together operate as a system. When the encapsulation is performed properly by a system designer, extensions to a certified system can be easily obtained without having to recertify the code associated with one or more of the reusable objects. It is believed that one of the best places to encapsulate, which is sometimes referred to as decomposing the system, would be in areas where is either anticipated to change or anticipated not to change. An example is an aircraft. Various subsystems on the aircraft are likely to change, for example, software updates associated with radar and GPS to name two. The software associated with the radar and/or GPS may be placed into one or two virtual machines. Continuing with the aircraft example, it seems less likely that a scheduler or executive program would be prone to change, therefore it might be placed into a separate virtual machine. Other software modules, where likelihood of change is not easily determined, are then placed in one or more other virtual machines.

Another example of encapsulation (decomposition) is the placement of an I/O handler, such as an Internet Protocol (IP) handler, placed in a standalone virtual machine associated with a networked system. As the IP handler is not likely to change, a separate virtual machine is a logical choice. The IP handler, in one example, hands all of its message traffic off to a gateway virtual machine that filters the message traffic on the basis of security requirements. Such security requirements are susceptible to change, so they might be placed in a separate virtual machine. The message traffic is forwarded on to the rest of the system using, for example, inter-operating system communication or virtual I/O devices.

The described virtual machines have to be able to communicate. One possible communication mechanism is the use of a device driver in the operating system and the interception of the communications traffic with a virtual I/O device. Another embodiment for virtual machine communications includes a form of inter-operating system communication provided by the virtualization layer.

While the invention has been described in terms of various specific embodiments, those skilled in the art will recognize that the invention can be practiced with modification within the spirit and scope of the claims.

What is claimed is:

1. A method for reusing one or more originally certified software applications without recertification, said method comprising:
   identifying the one or more originally certified software applications that are likely to change and unlikely to change during a given time frame;
   creating one or more virtual machines corresponding to each of the one or more originally certified software applications likely to change and unlikely to change, for the purpose of isolating the one or more originally certified software applications from a certification process;
   upon a change in one of the originally certified software applications identified as likely to change, creating a first virtual machine, that includes the change in one of the originally certified software applications, the first virtual machine including an operating system and an interface, the first virtual machine being a system virtual machine configured as a component of a system architecture based on a plurality of system virtual machines;
   certifying the first virtual machine for a specific virtualized computing platform, wherein certifying the first virtual machine includes testing the changed originally certified software application using the specific virtualized computing platform and determining whether the first virtual machine conforms to a certification standard; and
   deploying the certified first virtual machine, including the operating system and the interface, in the specific virtualized computing platform as a component of the system architecture;
   wherein deploying the certified first virtual machine comprises at least one of:
   (i) creating a virtual input/output (I/O) device, that has a same interface as an I/O device associated with a hardware platform, for each of the corresponding one or more virtual machines created for the one or more originally certified software applications likely to change, intercepting I/O traffic with a corresponding virtual I/O device of the originally certified application, passing the intercepted I/O traffic to the certified first virtual machine via a corresponding virtual I/O device of the certified first virtual machine; or
   (ii) providing an inter-operating system communication mechanism between the interface of the certified first virtual machine and another virtual machine, wherein the inter-operating system communication mechanism includes at least one of a virtual network, interrupts, sockets, message queues, semaphores, events, or shared memory space.

2. A method according to claim 1 wherein generating a mechanism for communication comprises generating the virtual input/output device to provide an interface between an input/output device driver associated with the one or more originally certified and changed originally certified software applications and the input/output device associated with the hardware platform.

3. A method according to claim 1 wherein creating the one or more virtual machines for originally certified software applications likely to change comprises decomposing the originally certified software applications likely to change into multiple virtual machines for the purpose of isolating any unchanged originally certified software applications from the certification process initiated upon a change in the originally certified software application identified as likely to change.

4. A method according to claim 1 wherein creating the first virtual machine comprises creating the first virtual machine for at least one of a scheduler and an executive associated with the software applications, the first virtual machine accessible through at least one of the virtual I/O device and the inter-operating system communication mechanism.

5. A packaging method for providing one or more portable, originally certified software applications, said method comprising:
   identifying one or more originally certified software applications that are likely to change and unlikely to change during a given time frame;
   creating one or more virtual machines corresponding to each of the one or more originally certified software applications likely to change and unlikely to change, for the purpose of isolating the one or more originally certified software applications from a certification process;
   upon a change in one of the originally certified software applications identified as likely to change, packaging the change of one of the originally certified software applications, an operating system associated with the changed originally certified software application, and at least one communication device within a first virtual machine, the first virtual machine being a system virtual machine configured as a component of a system architecture based on a plurality of system virtual machines;
   certifying the first virtual machine for a specific virtualized computing platform, wherein certifying the first virtual machine includes testing the changed originally certified software application using the specific virtualized computing platform and determining whether the first virtual machine conforms to a certification standard;
   configuring the at least one communication device to interface to the certified first virtual machine;
   utilizing the at least one communication device as an interface between the certified first virtual machine and a hardware platform underlying the specific virtualized computing platform; and
   deploying the certified first virtual machine, wherein deploying includes at least one of:
   (i) creating a virtual input/output (I/O) device, that has a same interface as an I/O device associated with the hardware platform, for each of the corresponding one or more virtual machines created for the one or more originally certified software applications likely to change, intercepting I/O traffic with a corresponding virtual I/O device of the originally certified software application, passing the intercepted I/O traffic to the certified first virtual machine via a corresponding virtual I/O device of the certified first virtual machine; or
   (ii) providing an inter-operating system communication mechanism between the interface of the certified first virtual machine and another virtual machine, wherein the inter-operating system communication mechanism includes at least one of a virtual network, interrupts, sockets, message queues, semaphores, events, or shared memory space.

6. A method according to claim 5 further comprising:
creating a second virtual machine that includes at least one software application;
interfacing the certified first virtual machine and the second virtual machine; and
certifying the second virtual machine and the combination of the second virtual machine and the certified first virtual machine for the specific virtualized computing platform.

7. A method according to claim 6 wherein interfacing the certified first virtual machine and the second virtual machine comprises utilizing communication devices within the software application, the operating system, and the specific virtualized computing platform.

8. A system architecture comprising:
a processor;
a first virtual machine comprising a first originally certified software application that is identified as likely to change or unlikely to change during a given time frame, wherein the first virtual machine was created for the purpose of isolating the first originally certified software application from a certification process, the first virtual machine including an operating system associated with the originally certified software application, wherein the first virtual machine is certified for a specific virtualized computing platform at least in part by testing the first originally certified software application using the specific virtualized computing platform and determining whether the first virtual machine conforms to a certification standard, said first virtual machine being a system virtual machine configured as a component of the system architecture;
a second virtual machine comprising a change in the originally certified software application that is identified as likely to change or unlikely to change during the given time frame, the second virtual machine including an operating system associated with the changed originally certified software application wherein the second-virtual machine is certified for the specific virtualized computing platform at least in part by testing the changed originally certified software application using the specific virtualized computing platform and determining whether the second virtual machine conforms to the certification standard, said second virtual machine also being a system virtual machine configured as a component of the system architecture; and
a communications mechanism provided by the specific virtualized computing platform configured to interface said certified first virtual machine to said certified second virtual machine, and to provide an interface for said certified first and certified second virtual machines to an input/output (I/O) device associated with a hardware platform underlying the specific virtualized computing platform;
wherein said communications mechanism includes at least one of:
(i) a first virtual I/O device configured with the same interface as the I/O device associated with the hardware platform, said first virtual I/O device interfaced to said certified first virtual machine and configured to intercept I/O traffic from said certified first virtual machine; a second virtual I/O device configured to receive the intercepted I/O traffic from said first virtual I/O device and forward the intercepted I/O traffic to said certified second virtual machine; and a third virtual I/O device configured to receive the intercepted I/O traffic from said certified second virtual machine and provide the interface to the hardware platform; or
(ii) an inter-operating system communication mechanism including at least one of a virtual network, interrupts, sockets, message queues, semaphores, events, or shared memory space.

9. A system according to claim 8 wherein each of said certified first virtual machine and said second virtual machine further comprises:
at least one driver, said at least one driver providing an interface between said communications mechanism and said originally certified and said changed originally certified software applications.

10. A system according to claim 9 wherein said communications mechanism comprises a virtual I/O device, said virtual I/O device configured to provide an interface between said at least one driver and the I/O device associated with the hardware platform.

11. A system according to claim 8 wherein said communication mechanism is configured to route data from a device driver associated with said certified first virtual machine to said certified second virtual machine, said certified second virtual machine configured with an interface to a device associated with the device driver.

12. A system according to claim 8 wherein:
said certified first virtual machine and said certified second virtual machine each comprise scheduler inter-operating system communication interfaces; and
said communications mechanism comprises a plurality of inter-operating system communication devices configured to interface said scheduler inter-operating system communication interfaces respectively associated with said first originally certified software application and said changed originally certified software application.

13. A system according to claim 8 wherein said certified second virtual machine and said changed originally certified application therein comprise an extension to said first originally certified software application.

* * * * *